(12) United States Patent
Kim et al.

(10) Patent No.: US 10,203,565 B2
(45) Date of Patent: Feb. 12, 2019

(54) LIQUID CRYSTAL DISPLAY

(71) Applicant: Samsung Display Co. Ltd., Yongin (KR)

(72) Inventors: Kyeong Jong Kim, Suwon-si (KR); Hoon Kim, Ansan-si (KR); Heung Shik Park, Seoul (KR); Ki Chul Shin, Seongnam-si (KR)

(73) Assignee: SAMSUNG DISPLAY CO., LTD, Gyeonggi-Do (KR)

( * ) Notice: Subject to any disclaimer, the term of this patent is extended or adjusted under 35 U.S.C. 154(b) by 166 days.

(21) Appl. No.: 15/059,460

(22) Filed: Mar. 3, 2016

(65) Prior Publication Data

US 2016/0377936 A1 Dec. 29, 2016

(30) Foreign Application Priority Data

Jun. 24, 2015 (KR) .......................... 10-2015-0089917

(51) Int. Cl.
*G02F 1/1343* (2006.01)
*G02F 1/139* (2006.01)

(52) U.S. Cl.
CPC ........ *G02F 1/134309* (2013.01); *G02F 1/139* (2013.01); *G02F 2001/134318* (2013.01)

(58) Field of Classification Search
CPC ................................................ G02F 1/134309
See application file for complete search history.

(56) References Cited

U.S. PATENT DOCUMENTS

| 8,269,935 B2* | 9/2012 | Kuo .................. G02F 1/133707 349/114 |
| 8,345,199 B2 | 1/2013 | Hashimoto et al. |
| 2007/0188679 A1* | 8/2007 | Liao .................. G02F 1/133514 349/106 |
| 2017/0139278 A1* | 5/2017 | Zhong ............... G02F 1/133707 |

FOREIGN PATENT DOCUMENTS

| KR | 1020120031801 | 4/2012 |
| KR | 1020140097905 | 8/2014 |
| KR | 1020140098963 | 8/2014 |

* cited by examiner

*Primary Examiner* — Alexander Gross
(74) *Attorney, Agent, or Firm* — Cantor Colburn LLP

(57) ABSTRACT

Liquid crystal display includes a first substrate which includes a pixel electrode disposed in each pixel, a second substrate which faces the first substrate and includes a common electrode and an insulating layer, and a liquid crystal layer which is disposed between the first substrate and the second substrate, where the common electrode includes a first common electrode which is disposed on the whole surface defining the second substrate and a second common electrode which is disposed on the first common electrode with the insulating layer interposed therebetween and includes an opening defined in each pixel, and each pixel includes a first region in which the pixel electrode and the first common electrode face each other through the opening and a second region in which the pixel electrode and the second common electrode face each other.

11 Claims, 11 Drawing Sheets

[Fig 1]
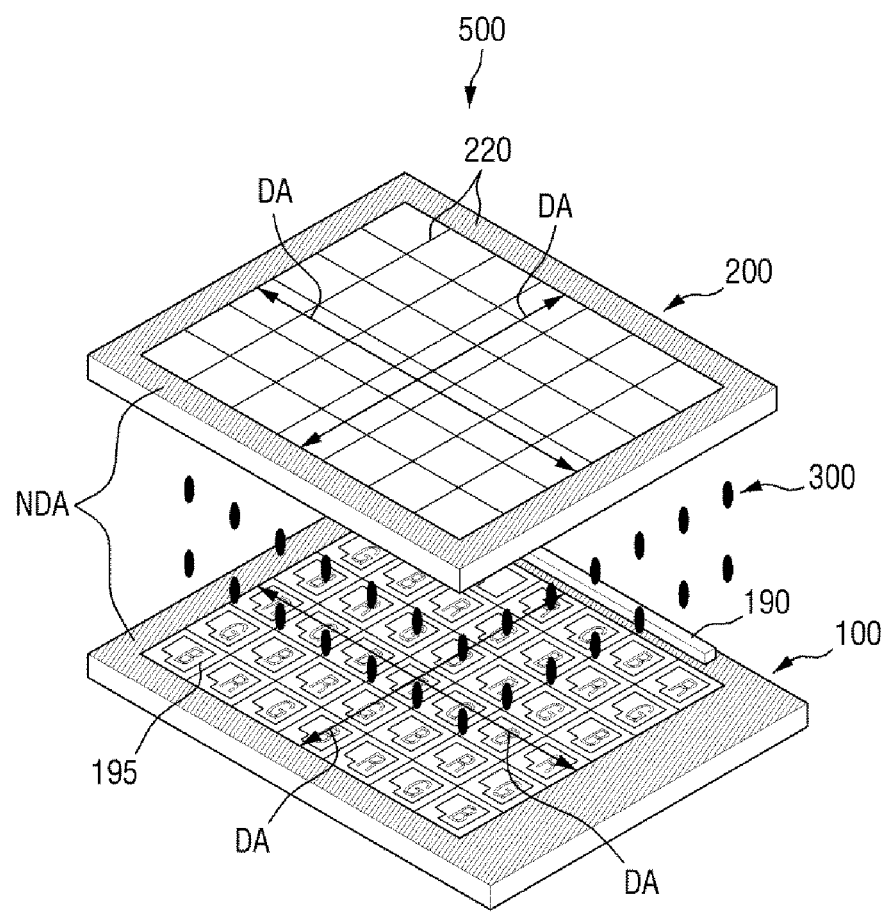

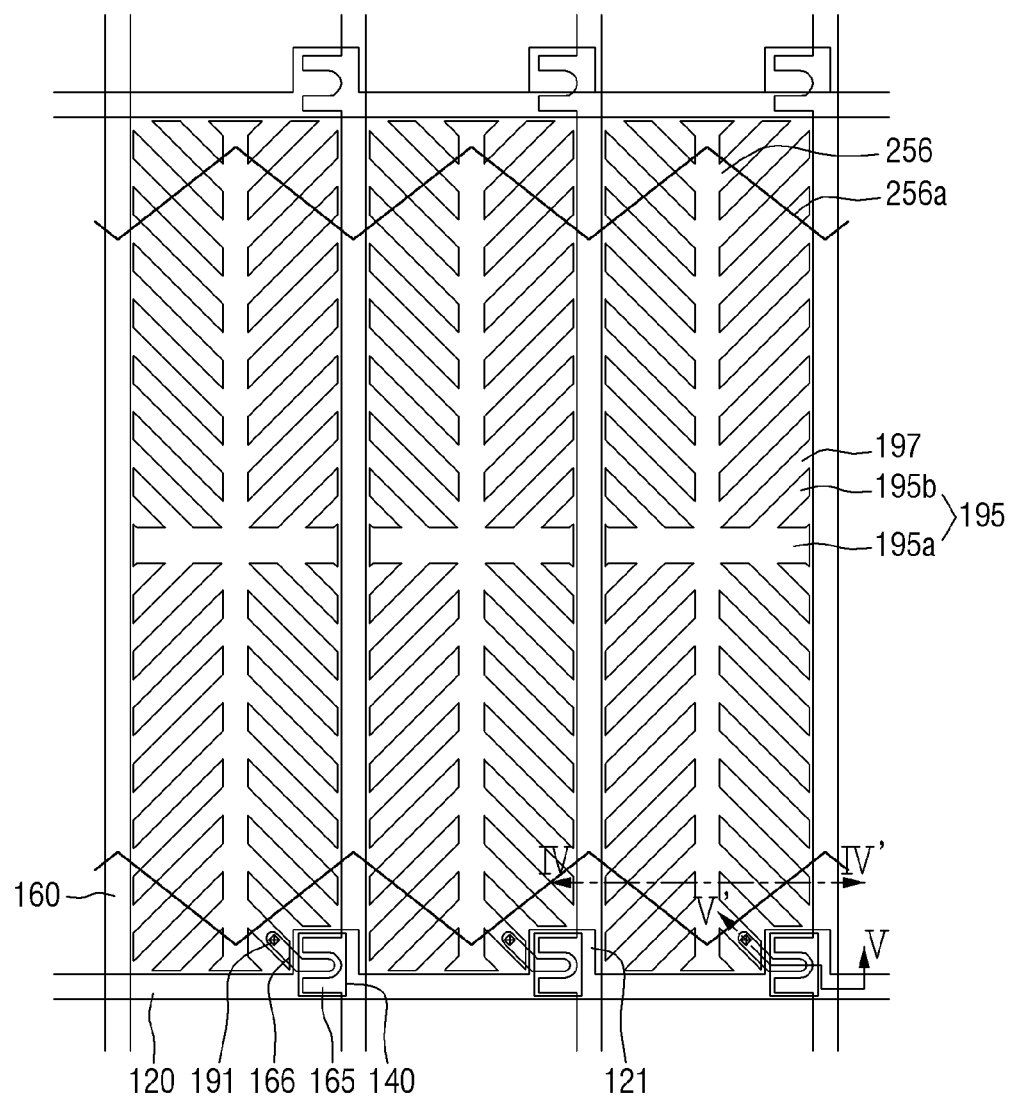
[Fig 2]

[Fig 3]
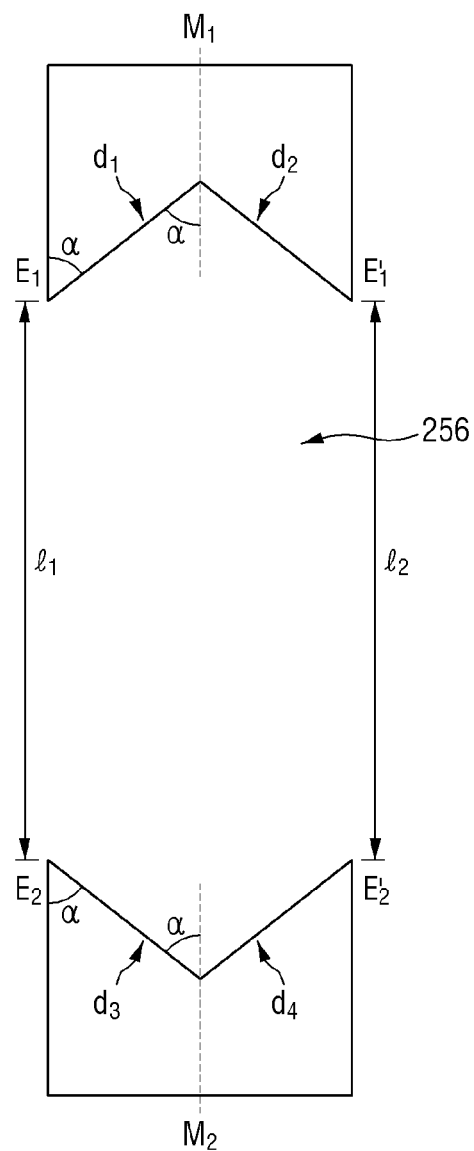

[Fig 4]
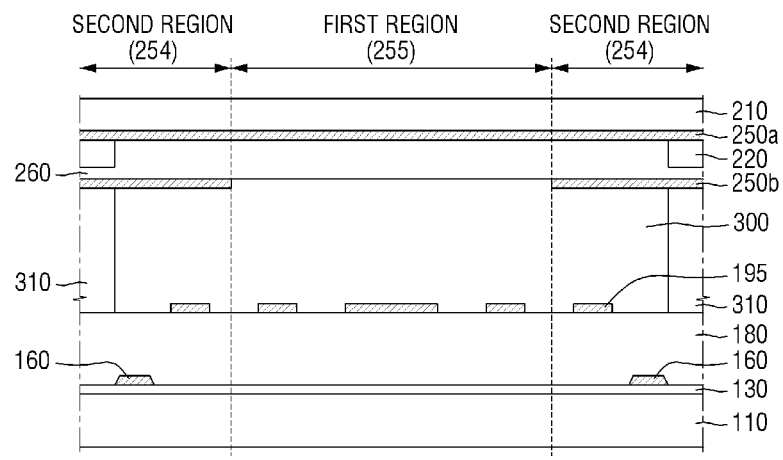
[Fig 5]
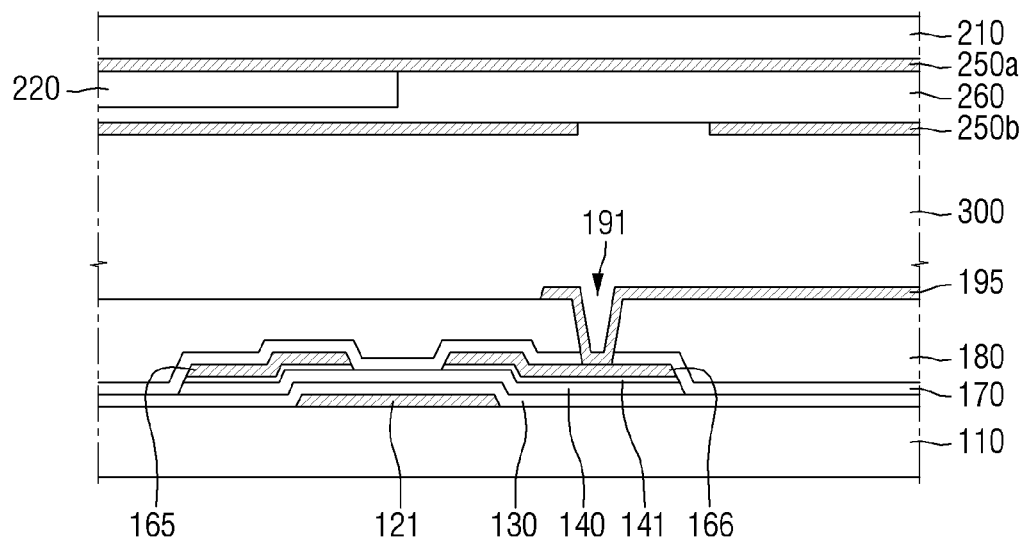

[Fig 6]
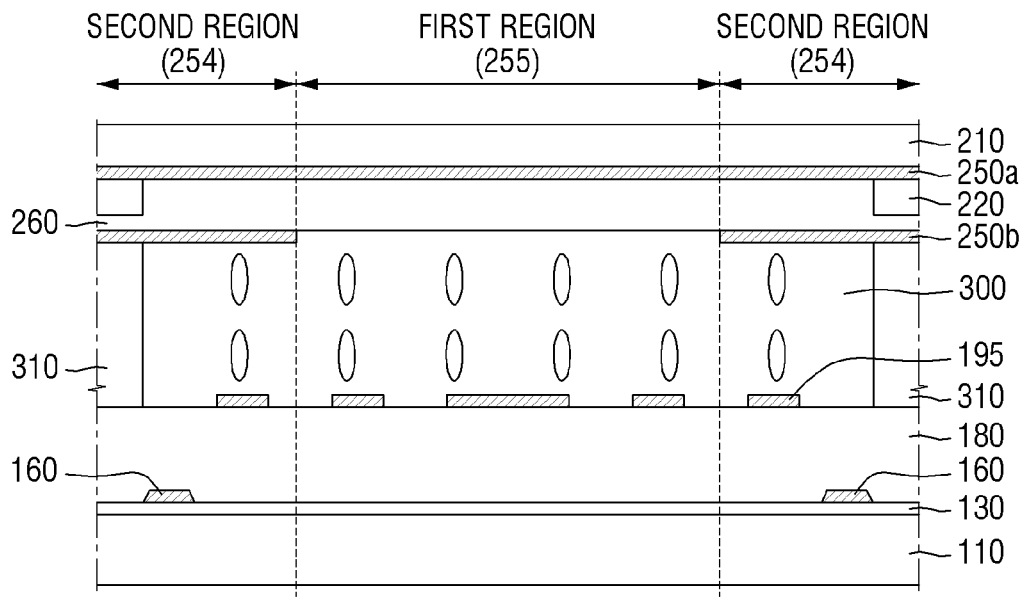
[Fig 7]
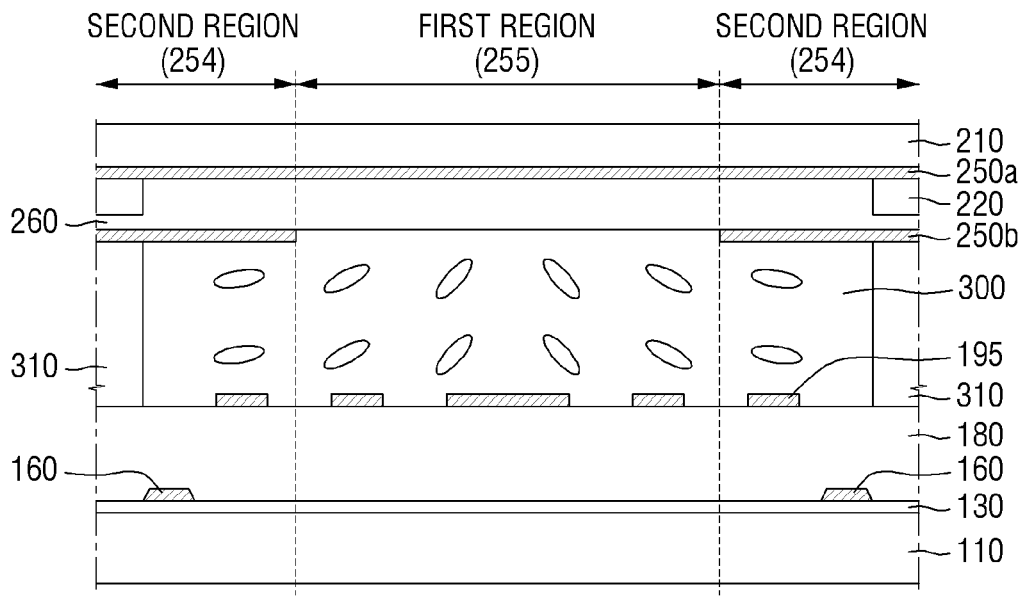

[Fig 8]
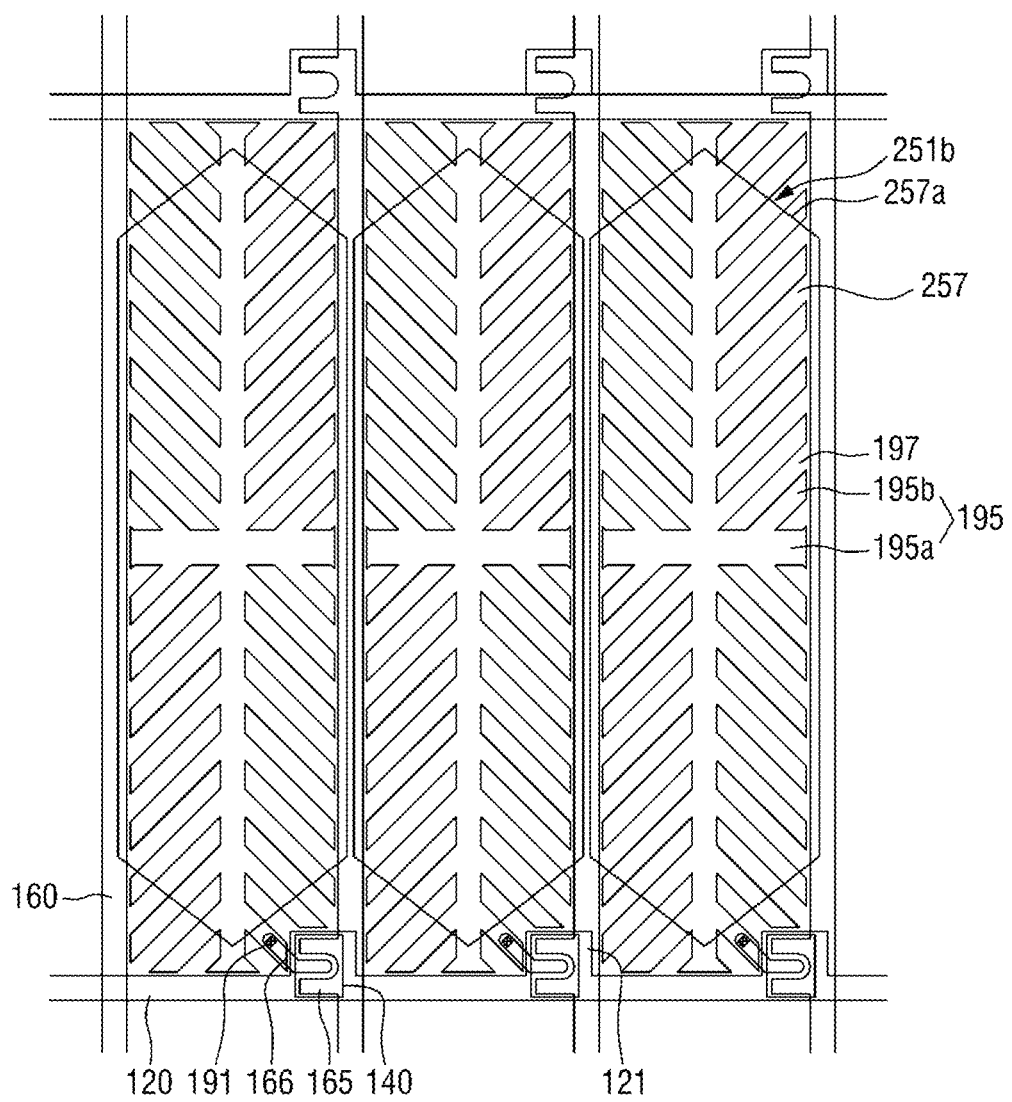

[Fig 9]
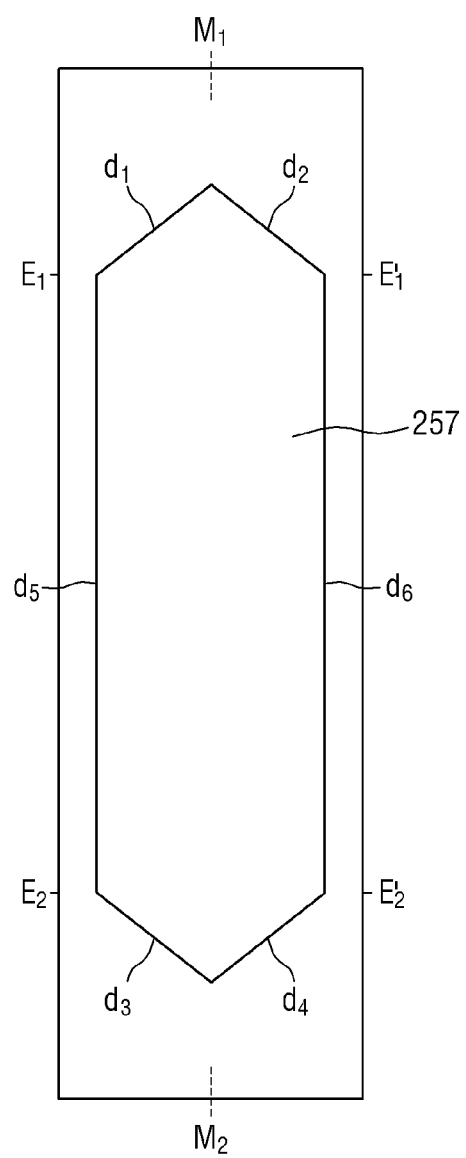

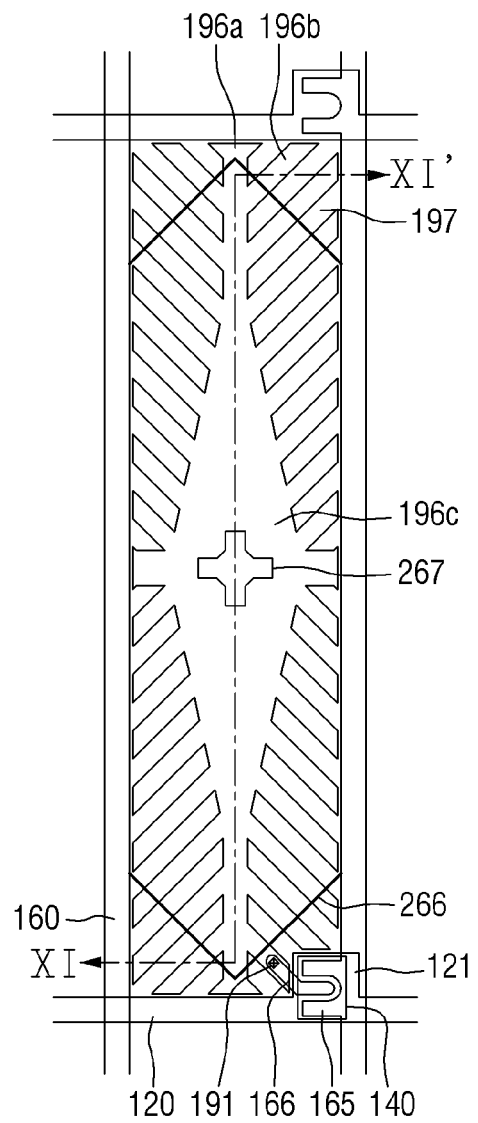
[Fig 10]

[Fig 11]
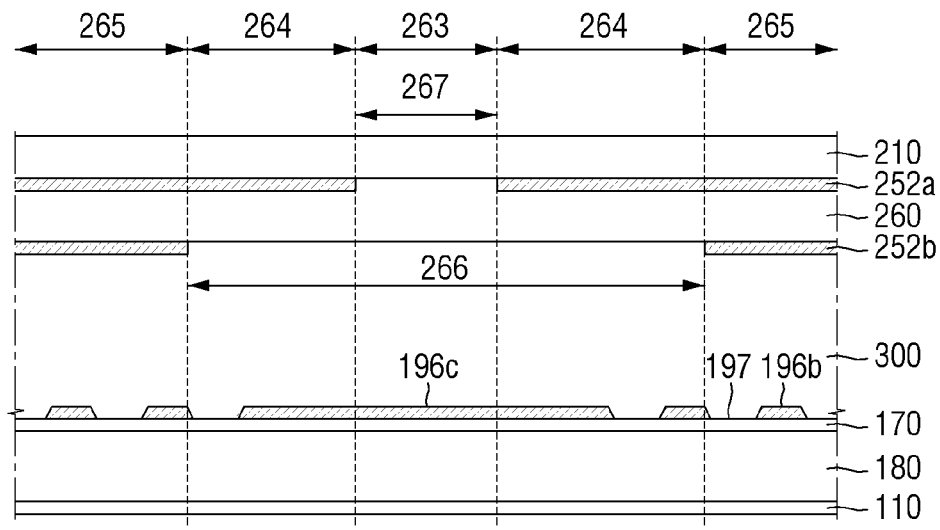
[Fig 12]
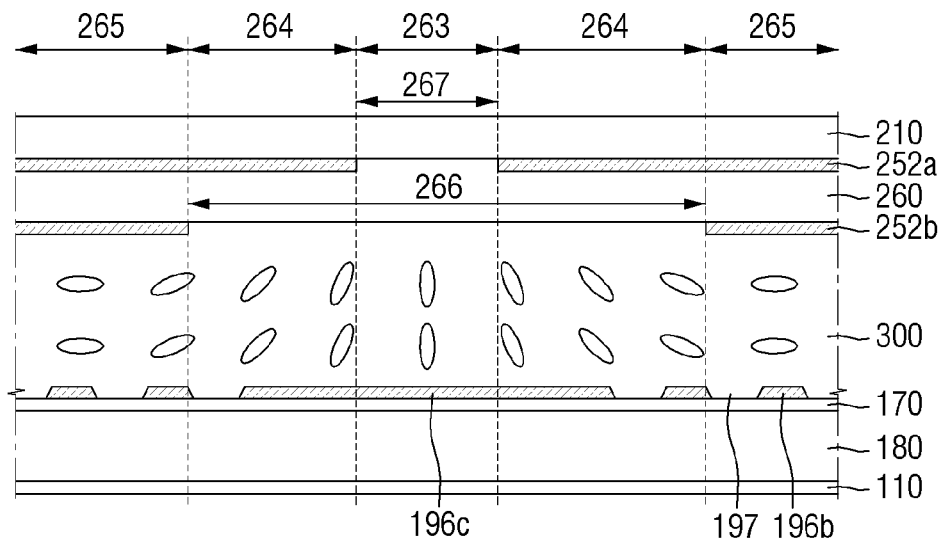

[Fig 13]
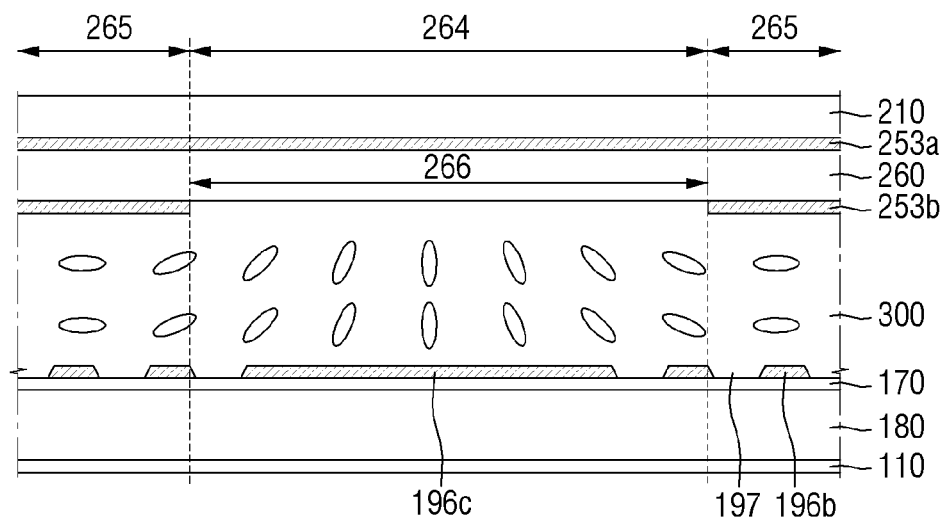
[Fig 14]
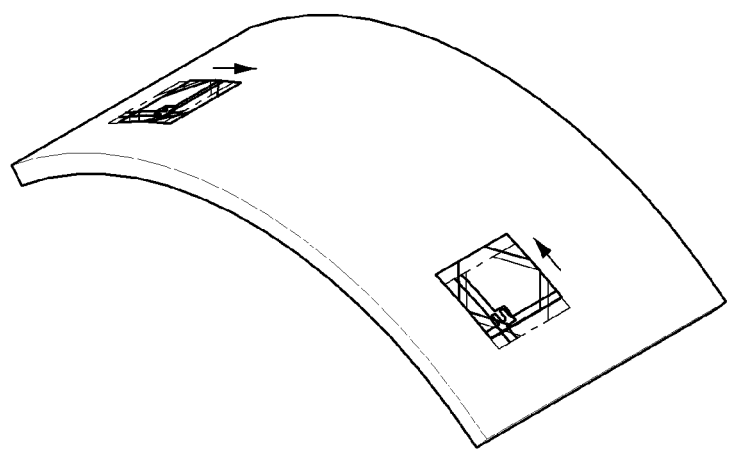
[Fig 15]
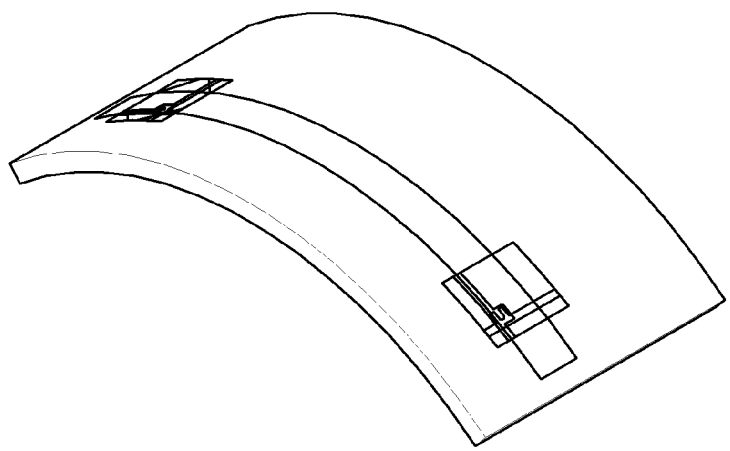

[Fig 16]
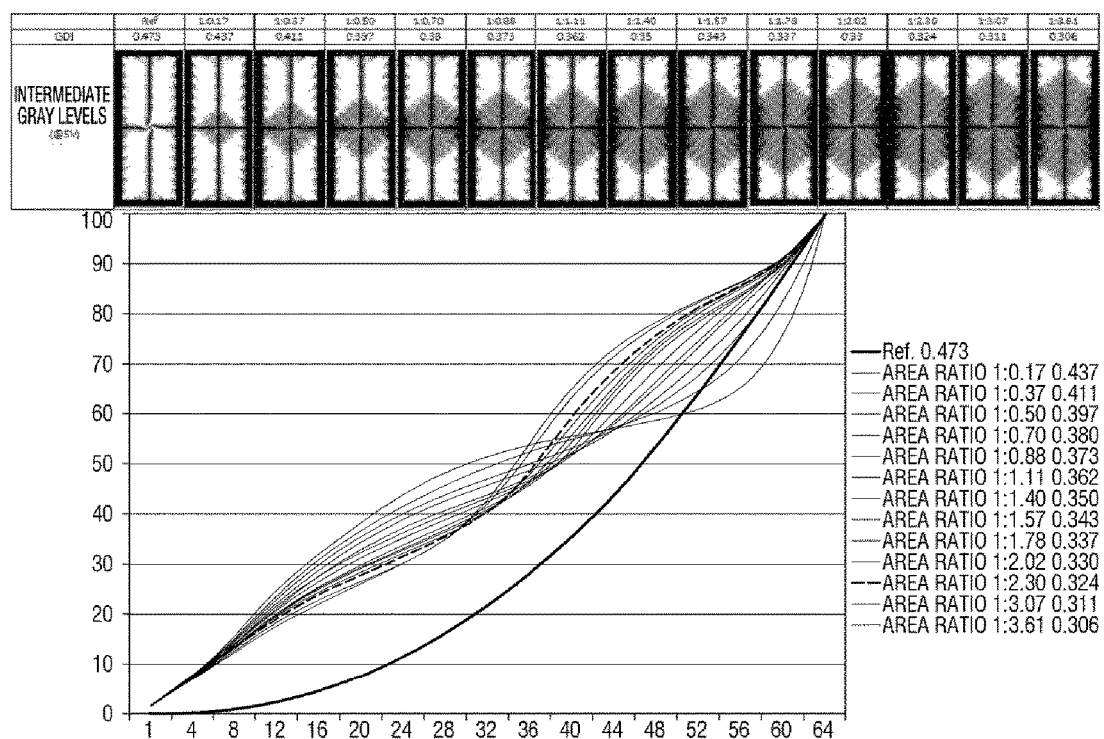

LIQUID CRYSTAL DISPLAY

This application claims priority to Korean Patent Application No. 10-2015-0089917 filed on Jun. 24, 2015, and all the benefits accruing therefrom under 35 U.S.C. § 119, the content of which in its entirety is herein incorporated by reference.

BACKGROUND

1. Field

Exemplary embodiments of the invention relate to a display device, and more particularly to liquid crystal display ("LCD") having a liquid crystal layer interposed between display substrates.

2. Description of the Related Art

Display devices are devices that visually display data. Examples of the display devices include liquid crystal displays ("LCDs"), electrophoretic displays, organic light-emitting displays, inorganic electroluminescent ("EL") displays, field emission displays, surface-conduction electron-emitter displays, plasma displays, and cathode ray displays.

In particular, an LCD is one of the most widely used types of flat displays. Generally, an LCD includes a pair of display substrates having electric field generating electrodes, such as pixel electrodes and common electrodes, and a liquid crystal layer interposed between the display substrates. In an LCD, voltages are applied to electric field generating electrodes to generate an electric field. Accordingly, the alignment of liquid crystal molecules of a liquid crystal layer is determined, and polarized light of incident light is controlled. As a result, a desired image is displayed on the LCD.

Of LCDs, vertical alignment ("VA") mode LCDs, in which main directors of liquid crystal molecules are aligned perpendicular to upper and lower display substrates when no electric field is applied, are popular due to their high contrast ratios and wide standard viewing angles.

It may be beneficial for LCDs to have not only superior front visibility but also superior lateral visibility. For superior lateral visibility, methods of partitioning a pixel electrode into two or more sub-electrodes and applying different voltages to the sub-electrodes are being suggested.

SUMMARY

To apply different voltages to sub-electrodes of a pixel electrode, a plurality of wirings and a plurality of thin-film transistors ("TFTs") are generally needed. However, as the number of wrings or TFTs increases, an aperture ratio may decrease, thereby reducing transmittance.

Exemplary embodiments of the invention provide a liquid crystal display ("LCD") having a sufficiently high aperture ratio and improved lateral visibility.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, a liquid crystal display device includes a first substrate which includes a pixel electrode disposed in each pixel, a second substrate which faces the first substrate and includes a common electrode and an insulating layer, and a liquid crystal layer which is disposed between the first substrate and the second substrate, where the common electrode includes a first common electrode which is disposed on the whole surface defining the second substrate and a second common electrode which is disposed on the first common electrode with the insulating layer interposed therebetween and includes an opening defined in each pixel, and each pixel includes a first region in which the pixel electrode and the first common electrode face each other through the opening and a second region in which the pixel electrode and the second common electrode face each other.

In an exemplary embodiment, the same common voltage may be applied to the first common electrode and the second common electrode.

In an exemplary embodiment, an electric field generated between the pixel electrode and the second common electrode in the second region may be greater than an electric field generated between the pixel electrode and the first common electrode in the first region.

In an exemplary embodiment, the second common electrode may protrude along a boundary between two adjacent pixel electrodes.

In an exemplary embodiment, the opening may provide a closed loop in the pixel electrode disposed in each pixel.

In an exemplary embodiment, the area of the second common electrode may increase from a central part of the pixel electrode toward a boundary part thereof.

In an exemplary embodiment, the area of the second common electrode may increase from a central part of the pixel electrode toward a boundary part thereof.

In an exemplary embodiment, the pixel electrode may include a stem part which forms a boundary between the domains and a plurality of branches which extend in different directions in two different domains.

In an exemplary embodiment, a boundary line between the second common electrode and the opening may extend in a direction perpendicular to a direction in which the branches extend, and the direction in which the boundary line between the second common electrode and the opening extends is changed at the stem part.

In an exemplary embodiment, the opening may be defined in the pixel electrode to have a hexagonal shape.

According to another exemplary embodiment of the invention, a display device includes a first insulating substrate, a second insulating substrate which faces the first insulating substrate, and a liquid crystal layer which is disposed between the first insulating substrate and the second insulating substrate, where the first insulating substrate includes a gate line which is disposed on the first insulating substrate and extends along a first direction, a data line which intersects the gate line to be insulated from the gate line and extends along a second direction and a pixel electrode which receives a voltage from the data line, and the second insulating substrate includes a first common electrode which is disposed on the second insulating substrate, an overcoating layer which is disposed on the first common electrode and a second common electrode which is disposed on the overcoating layer and provided around an opening.

In an exemplary embodiment, the display device may be divided into a plurality of unit pixel regions, each defined by the gate line and the data line intersecting each other, where the second common electrode occupies a predetermined area of each of the unit pixel regions.

In an exemplary embodiment, a pattern of the second common electrode may be repeated to correspond to each of the unit pixel regions.

In an exemplary embodiment, the pixel electrode disposed in each of the unit pixel regions may include a plate part, a stem part which protrudes from the plate part and extends parallel to the gate line or the data line so as to divide the unit pixel region into a plurality of domains, and branches which protrude from the plate part or the stem part, extend in different directions in different domains, and are separated from each other.

In an exemplary embodiment, a portion of the second common electrode which may correspond to the plate part is removed.

In an exemplary embodiment, an opening may be defined in the first common electrode at a location corresponding to the plate part, where the opening is parallel to the gate line or the data line.

In an exemplary embodiment, each of the unit pixel regions may be divided into a first region in which the second common electrode is not disposed and a second region in which the second common electrode is disposed, where a boundary between the first region and the second region is perpendicular to a direction in which the branches extend.

In an exemplary embodiment, the boundary between the first region and the second region may have a hexagonal shape in each of the unit pixel regions, and at least one of boundary lines between the first region and the second region is parallel to the data line.

In an exemplary embodiment, an electric field generated in the first region may be greater than an electric field generated in the second region.

In an exemplary embodiment, the boundary lines between the first region and the second region may be parallel to the gate line between two adjacent unit pixel regions.

BRIEF DESCRIPTION OF THE DRAWINGS

The above and other exemplary embodiments and features of the invention will become more apparent by describing in detail exemplary embodiments thereof with reference to the attached drawings, in which:

FIG. 1 is a schematic exploded perspective view of an exemplary embodiment of a liquid crystal display ("LCD") according to the invention;

FIG. 2 is a plan view of the LCD illustrated in FIG. 1;

FIG. 3 is a plan view of an exemplary embodiment of a second common electrode disposed in one pixel region according to the invention;

FIG. 4 is a cross-sectional view taken along line IV-IV' of FIG. 2;

FIG. 5 is a cross-sectional view taken along line V-V' of FIG. 2;

FIGS. 6 and 7 are conceptual diagrams illustrating the arrangement state of liquid crystal molecules of the LCD of FIG. 1;

FIG. 8 is a plan view of another exemplary embodiment of an LCD according to the invention;

FIG. 9 is a plan view of a second common electrode disposed in one pixel region of FIG. 8;

FIG. 10 is a plan view of another exemplary embodiment of an LCD according to the invention;

FIG. 11 is a cross-sectional view taken along line XI-XI' of FIG. 10;

FIGS. 12 and 13 are conceptual diagrams illustrating exemplary embodiments of the arrangement state of liquid crystal molecules in LCDs according to the invention;

FIGS. 14 and 15 are perspective views of a curved LCD; and

FIG. 16 is a graph illustrating the change in visibility index of various exemplary embodiments of LCDs according to the invention.

DETAILED DESCRIPTION

Advantages and features of the invention and methods of accomplishing the same may be understood more readily by reference to the following detailed description of preferred embodiments and the accompanying drawings. The invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the invention will be described with reference to the attached drawings.

The structure of a liquid crystal display ("LCD") according to an exemplary embodiment of the invention will now be described with reference to FIGS. 1 through 5.

FIG. 1 is a schematic exploded perspective view of an LCD 500 according to an exemplary embodiment of the invention. Referring to FIG. 1, the LCD 500 may include a first substrate 100, a second substrate 200 which faces the first substrate 100, and a liquid crystal layer 300 which is interposed between the first substrate 100 and the second substrate 200.

Each of the first and second substrates 100 and 200 includes a display area DA and a non-display area NDA. A plurality of pixels arranged in a matrix may be defined in the display area DA.

A pixel electrode 195 may be disposed in each pixel of the display area DA of the first substrate 100. The pixel electrode 195 may receive a data voltage through a thin-film transistor ("TFT") T. The pixel electrode 195 may generate an electric field together with first and second common electrode 250a (refer to FIGS. 5) and 250b (refer to FIG. 5), thereby controlling the alignment direction of liquid crystal molecules in the liquid crystal layer 300 disposed between the pixel electrode 195 and the first and second common electrode 250a and 250b.

A driver 190 may be disposed in the non-display area NDA of the first substrate 100 and provide a gate driving signal, a data driving signal, etc. to each pixel of the display area DA.

The gate driving signal generates a gate-on voltage signal or a gate-off voltage signal to be applied to each gate line 120 (FIG. 2). The data driving signal determines a gray voltage that is to be applied to each pixel according to each gate driving signal and delivers a signal about the gray voltage to each data line 160.

A color filter may be disposed in each pixel in the display area DA of the first substrate 100 or the second substrate 200. In an exemplary embodiment, the color filters may include a red filter, a green filter and a blue filter, for example. In an exemplary embodiment, the red, green and blue filters may be alternately and respectively disposed in the pixels, which are arranged in a matrix, along each row and column of the matrix.

The first substrate 100 and the second substrate 200 may be bonded together by a sealing member (not illustrated) such as a sealant. The sealing member may be located in the non-display area NDA, i.e., on the periphery of each of the first substrate 100 and the second substrate 200. The liquid crystal layer 300 located between the first substrate 100 and the second substrate 200 may be sealed in the LCD 500 by the sealing member.

A spacer 310 (refer to FIG. 4) may be disposed between the first substrate 100 and the second substrate 200. The spacer 310 (refer to FIG. 4) maintains a cell gap between the first substrate 100 and the second substrate 200. The spacer 310 (refer to FIG. 4) may overlap at least one of each gate line 120, each data line 160, and each TFT T.

The structure of each pixel of the LCD 500 will now be described in more detail.

FIG. 2 is a plan view of the LCD 500 illustrated in FIG. 1. FIG. 3 is a plan view of the second common electrode 250b disposed in one pixel region according to an exemplary embodiment of the invention. FIG. 4 is a cross-sectional view taken along line IV-IV' of FIG. 2. FIG. 5 is a cross-sectional view taken along line V-V' of FIG. 2.

Referring to FIGS. 2 through 5, the first substrate 100 includes a first insulating substrate 110. In an exemplary embodiment, the first insulating substrate 110 may include an insulating material such as, but not limited to, transparent glass, quartz, ceramic, silicon or transparent plastic.

A plurality of gate wirings 120 and 121 and a plurality of data wirings 160, 165 and 166 are disposed on the first insulating substrate 110. The gate wirings 120 and 121 and the data wirings 160, 165 and 166 are disposed on different layers with a gate insulating layer 130 interposed therebetween.

In an exemplary embodiment, the gate wirings 120 and 121 and the data wirings 160, 165 and 166 may include aluminum (Al)-based metal such as aluminum and an aluminum alloy, silver (Ag)-based metal such as silver and a silver alloy, copper (Cu)-based metal such as copper and a copper alloy, molybdenum (Mo)-based metal such as molybdenum and a molybdenum alloy, chrome (Cr), titanium (Ti), or tantalum (Ta). In an exemplary embodiment, the gate wirings 120 and 121 and the data wirings 160, 165 and 166 may have a multilayer structure including two conductive layers (not illustrated) with different physical characteristics. In an exemplary embodiment, one of the two conductive layers may include aluminum-based metal, silver-based metal or copper-based metal, for example. In the exemplary embodiment, the other one of the conductive layers may include molybdenum-based metal, chrome, titanium, or tantalum, for example. Examples of the multilayer structure include a chrome lower layer and an aluminum upper layer and an aluminum lower layer and a molybdenum upper layer. However, the invention is not limited thereto.

The gate wirings 120 and 121 and the data wirings 160, 165 and 166 may include various metals and conductors.

The gate wirings 120 and 121 may include a plurality of gate lines 120 and a plurality of gate electrodes 121. The data wirings 160, 165 and 166 may include a plurality of data lines 160, a plurality of source electrodes 165, and a plurality of drain electrodes 166.

Each of the gate lines 120 may extend in a first direction, for example, in a horizontal direction along horizontal boundaries of pixels. Each of the data lines 160 may extend in a second direction, for example, in a vertical direction along vertical boundaries of pixels. The gate lines 120 and the data lines 160 may perpendicularly intersect each other to define a plurality of pixel regions. That is, the pixel regions may be defined in regions surrounded by the gate lines 120 and the data lines 160.

At least one gate electrode 121 is connected to a gate line 120 in each pixel. The gate electrode 121 may branch from the gate line 120 toward a semiconductor layer 140 or may be provided by extending the gate line 120. However, the invention is not limited thereto, and the gate electrode 121 may also be defined in a region of the gate line 120 which overlaps the semiconductor layer 140.

At least one source electrode 165 is connected to a data line 160 in each pixel. The source electrode 165 may branch from the data line 160 toward the semiconductor layer 140 or may be provided by extending the data line 160. However, the invention is not limited thereto, and the source electrode 165 may also be defined in a region of the data line 160 which overlaps the semiconductor layer 140. A drain electrode 166 may be separated from the source electrode 165 with respect to the semiconductor layer 140 and may be electrically connected to a pixel electrode 195 via a contact hole 191 defined in a organic layer 180.

The gate insulating layer 130 is disposed between the gate lines 120 and the data lines 160 to insulate them. The gate insulating layer 130 may be disposed on the gate wirings 120 and 121, and the data wirings 160, 165 and 166 may be disposed on the gate insulating layer 130. In an exemplary embodiment, the gate insulating layer 130 may include, for example, silicon nitride (SiNx), silicon oxide (SiO2), silicon oxynitride (SiON), or a stacked layer thereof.

In an exemplary embodiment, the semiconductor layer 140 is disposed on the gate insulating layer 130 and may include hydrogenated amorphous silicon, polycrystalline silicon or oxide semiconductor, for example. At least part of the semiconductor layer 140 overlaps the gate electrode 121. The semiconductor layer 140 forms a TFT T together with the gate electrode 121, the source electrode 165, and the drain electrode 166. Accordingly, a channel is defined in the semiconductor layer 140.

In an exemplary embodiment, the semiconductor layer 140 may have various shapes such as an island and a line, for example. In the exemplary embodiment of FIGS. 2 through 5, the semiconductor layer 140 is island-shaped. However, the shape of the semiconductor layer 140 is not limited to the island shape. The semiconductor layer 140 may also be shaped like a line. In this case, the semiconductor layer 140 may overlap the data wirings 160, 165 and 166, although not illustrated in the drawings. The semiconductor layer 140 may also be disposed in a space in which the source electrode 165 and the drain electrode 166 are separated from each other to face each other. Accordingly, the semiconductor layer 140 may provide a channel region.

An ohmic contact layer 141 including n+ hydrogenated amorphous silicon heavily doped with n-type impurities may be disposed on the semiconductor layer 140. The ohmic contact layer 151 may be located between the semiconductor layer 140 thereunder and the source electrode 165 and the drain electrode 166 thereon in order to reduce contact resistance between them. Like the semiconductor layer 140, the ohmic contact layer 141 may have various shapes such as an island and a line. When the semiconductor layer 140 is island-shaped, the ohmic contact layer 141 may also be island-shaped. When the semiconductor layer 140 is provided linearly, the ohmic contact layer 141 may also be provided linearly. Unlike the semiconductor layer 140, the ohmic contact layer 141 may not be disposed in the space in which the source electrode 165 and the drain electrode 166 are separated from each other to face each other. As a result, the ohmic contact layer 141 may expose the semiconductor layer 140 disposed thereunder. In another exemplary embodiment, the ohmic contact layer 141 may be omitted.

When a gate-on signal is transmitted to the gate electrode 121, the TFT T is turned on via a channel defined in the semiconductor layer 140 in response to the gate signal.

Then, the drain electrode 166 receives a data signal from the source electrode 165 and sends the received data signal to the pixel electrode 195.

The passivation layer 170 is disposed on the data wirings 160, 165 and 166 and an exposed portion of the semiconductor layer 140. The contact hole 191 may be defined in the passivation layer 180 to expose at least part of the drain electrode 166.

In an exemplary embodiment, the passivation layer 170 may include an inorganic material such as silicon nitride or silicon oxide, a material such as a-Si:C:O or a-Si:O:F provided by plasma enhanced chemical vapor deposition ("PECVD"), or an organic material. While the passivation layer 170 illustrated in the drawings is a single layer, it may also be a stack of multiple layers that include the above materials. In an exemplary embodiment, the passivation layer 170 may include a lower inorganic layer including an inorganic material and an upper organic layer including an organic material having photosensitivity, for example.

Further, a color filter (not illustrated) may be disposed in or on the passivation layer 170. The color filter may overlap the pixel electrode 195. In an exemplary embodiment, when the passivation layer 170 includes a lower inorganic layer and an upper organic layer, the color filter may be disposed between the lower inorganic layer and the upper organic layer. In another exemplary embodiment, the color filter may be disposed on the second substrate 200. The position of the color filter may be variously changed. Specific methods of changing the position of the color filter are known to those of ordinary skill in the art to which the invention pertains, and thus a description thereof is omitted.

The pixel electrode 195 may be disposed on the organic layer 180 in each unit pixel. A part of the pixel electrode 195 is disposed in the contact hole 191. The part of the pixel electrode 195 disposed in the contact hole 191 may contact the drain electrode 166 and thus be electrically connected to the drain electrode 166. The pixel electrode 195 may generate an electric field together with the first and second common electrodes 250a and 250b, thereby rotating the liquid crystal molecules included in the liquid crystal layer 300. In an exemplary embodiment, the pixel electrode 195 may include a transparent conductive material such as, but not limited to, indium tin oxide ("ITO") or indium zinc oxide ("IZO").

The pixel electrode 195 may include a stem part 195a which divides one pixel region into four domains and a plurality of branches 195b which extend in different directions in the four different domains. The stem part 195a may traverse the pixel region in the first direction and the second direction, and an intersection point of the stem part 195a may be a central point of the pixel region. The branches 195b may extend in the same direction within the same domain. A domain partition part 197 including an insulating material may be interposed between the branches 195b.

The branches 195b of the pixel electrode 195 may protrude from the stem part 195a of the pixel electrode 195. The branches 195b of the pixel electrode 195 may extend in a radial pattern from a center of the pixel electrode 195 and surround the stem part 195a of the pixel electrode 195.

The branches 195b may define a predetermined angle with a corresponding gate line 120. In an exemplary embodiment, the branches 195b located in an upper right domain of the pixel electrode 195 may define an angle of approximately 45 degrees with the gate line 120, and the branches 195b located in an upper left domain may define an angle of approximately 135 degrees with the gate line 120. In addition, the branches 195b located in a lower left domain of the pixel electrode 195 may define an angle of approximately −135 degrees with the gate line 120, and the branches 195b located in a lower right domain may define an angle of approximately −45 degrees with the gate line 120. The second substrate 200 will now be described. The second substrate 200 uses a second insulating substrate 210 as a base substrate. Like the first insulating substrate 110, the second insulating substrate 210 may include an insulating material such as transparent glass, quartz, ceramic, silicon or transparent plastic. An appropriate material may be selected as desired by those of ordinary skill in the art.

In an exemplary embodiment, the first and second common electrodes 250a and 250b are disposed on the second insulating substrate 210. In an exemplary embodiment, the first and second common electrodes 250a and 250b may include a transparent conductive material such as, but not limited to, ITO or IZO. An interlayer insulating film is interposed between the first common electrode 250a and the second common electrode 250b.

More specifically, the first common electrode 250a is disposed on the second insulating substrate 210. The first common electrode 250a covers the whole surface defining the second insulating substrate 210.

A light-blocking pattern 220 is disposed on the first common electrode 250a. The light-blocking pattern 220 may be disposed on the second insulating substrate 210 in a lattice pattern not only in the non-display area NDA but also at the boundary of each pixel in the display area DA.

The light-blocking pattern 220 may include a material that blocks incident light. A light-blocking effect may be obtained by reflecting or absorbing incident light. In an exemplary embodiment, to have the light-blocking effect, the light-blocking pattern 220 may include a metal with high reflectivity, such as chrome. In another example, the light-blocking pattern 220 may be provided as an organic layer that includes a material such as black dye or pigment. In this case, the light-blocking pattern 220 may have the light-blocking effect by absorbing most of incident light. In exemplary embodiments, the light-blocking pattern 220 may be provided as a stack of a metal layer and a black organic layer.

An overcoating layer 260 is disposed on the light-blocking pattern 220. The overcoating layer 260 may cover the light-blocking pattern 220 and the whole surface of the second insulating substrate 210. The overcoating layer 260 may remove and planarize steps provided by the light-blocking pattern 220. In an exemplary embodiment, the overcoating layer 260 may include a transparent organic layer.

The second common electrode 250b is disposed on the overcoating layer 260. An opening 256 is defined in the second common electrode 250b. The opening 256 is located in a central part of the pixel region. The second common electrode 250b is disposed on the overcoating layer 260 as a single body but may expose the surface of the overcoating layer 260 through the opening 256. In the pixel region of the LCD 500, a region in which the opening 256 is disposed and the second common electrode 250b is not disposed, will hereinafter be referred to as a first region 255, and a region in which the second common electrode 250b is disposed will hereinafter be referred to as a second region 254.

The first common electrode 250a and the second common electrode 250b are electrically connected to each other by a contact hole (not illustrated) in the non-display area NDA. Therefore, the same common voltage may be applied to the first common electrode 250a and the second common electrode 250b. However, the invention is not limited thereto, and different common voltages may also be applied to the first common electrode 250a and the second common electrode 250b, respectively.

The structures of the first and second common electrodes 250a and 250b will now be described in more detail with reference to FIGS. 2 and 3.

A side of the second common electrode 250b which is located at a boundary between the second common electrode 250b and the opening 256 or which faces the opening 256 will hereinafter be referred to as an opening side 256a. The opening side 256a corresponds to a boundary between the first region 255 and the second region 254.

A direction in which the opening side 256a extends may be perpendicular to a direction in which the branches 195b of the pixel electrode 195 overlapped by the opening side 256a extend. The opening side 256a may extend from a point on the stem part 195a parallel to a data line 160 in one unit pixel region in a direction perpendicular to the direction in which the branches 195b extend. Since the opening 256 is defined in the direction perpendicular to the direction in which the branches 195b extend, it does not interfere with a direction in which the liquid crystal molecules are rotated according to an electric field, which may reduce a texture phenomenon. The area of the second common electrode 250b may be increased from the unit pixel region toward the data line 160.

The direction in which the opening side 256a extends may be changed at the boundary of one unit pixel region as illustrated in FIG. 2. Thus, the shape of the opening side 256a in one unit pixel region may be repeated in two different pixel regions adjacent to the unit pixel region. In this way, the shape of the opening side 256a in one unit pixel region may be repeated in the same row or column of the LCD 500. The opening 256 may divide the second common electrode 250b in a column direction into different parts in the display area DA, but the different parts of the second common electrode 250b may be connected to each other in the non-display area NDA. Therefore, the same common voltage may be applied to the different parts of the second common electrode 250b.

The position of the opening side 256a will now be described in more detail with reference to FIG. 3.

The opening side 256a may include a first diagonal line $d_1$ and a second diagonal line $d_2$ which are horizontally symmetrical to each other with respect to a point on a line passing through a middle point $M_1$ on any one of sides that form one unit pixel region and extending parallel to a data line 160. The first diagonal line $d_1$ and the second diagonal line $d_2$ are horizontally symmetrical to each other and extend perpendicular to the direction in which the branches 195b extend. Therefore, an angle a (defined between the line passing through the middle point $M_1$ and each of the first and second diagonal lines $d_1$ and $d_2$) may be equal to an angle defined between the stem part 195a and the branches 195b. The opening side 256a thus extends up to a first point $E_1$ and a first opposite point $E_{1'}$ located on boundary lines of one unit pixel region. The opening side 256a is horizontally symmetrical to each other with respect to each of the first point $E_1$ and the first opposite $E_{1'}$ at the same angle as an included angle provided by the first diagonal line $d_1$ and the second diagonal line $d_2$. Accordingly, the first diagonal line $d_1$ and the second diagonal line $d_2$ are also provided in pixel regions adjacent to the unit pixel region.

The opening side 256a may further include a third diagonal line $d_3$ and a fourth diagonal line $d_4$. The third diagonal line $d_3$ and a fourth diagonal line $d_4$ are horizontally symmetrical to each other with respect to a point on a line passing through a middle point $M_2$ on a side that faces the side passing through the middle point $M_1$ in one unit pixel region. The third diagonal line $d_3$ and the fourth diagonal line $d_4$ are thus vertically symmetrical to the first diagonal line $d_1$ and the second diagonal line $d_2$ in one unit pixel region. The first through fourth diagonal lines $d_1$ through $d_4$ have equal lengths, and a first opening side 11 and a second opening side 12 also have equal lengths.

The arrangement of liquid crystal molecules of the LCD 500 illustrated in FIG. 1 will now be described with reference to FIGS. 6 and 7. FIGS. 6 and 7 are conceptual diagrams illustrating the arrangement state of liquid crystal molecules of the LCD 500 of FIG. 1.

FIG. 6 illustrates the arrangement of liquid crystal molecules before the application of an electric field. Before an electric field is applied, the liquid crystal molecules are arranged by an alignment layer (not illustrated) of the first substrate 100 and an alignment layer (not illustrated) of the second substrate 200, such that long axes thereof are perpendicular to the first substrate 100 and the second substrate 200.

FIG. 7 illustrates the arrangement of the liquid crystal molecules after the application of an electric field. When a pixel voltage and a common voltage are respectively applied to the pixel electrode 195 and the first and second common electrodes 250a and 250b, an electric field is generated between the first common electrode 250a and the pixel electrode 195 in the first region 255, and another electric field is generated between the second common electrode 250b and the pixel electrode 195 in the second region 254. Here, a distance and a dielectric constant between electrodes (i.e., the first common electrode 250a and the pixel electrode 195) that face each other in the first region 255 may be different from those between electrodes (i.e., the second common electrode 250b and the pixel electrode 195) that face each other in the second region 254. Therefore, even when the same common voltage is applied to the first common electrode 250a and the second common electrode 250b, the electric field generated in the first region 255 may be different from the electric field generated in the second region 254. In an exemplary embodiment, the electric field generated in the second region 254 in which electrodes are located relatively close to each other may be greater than the electric field generated in the first region 255, for example. Liquid crystal molecules having negative dielectric anisotropy tend to tilt in a direction perpendicular to the direction of an electric field. In particular, the liquid crystal molecules tend to tilt more as the intensity of the electric field increases.

Therefore, azimuths of the liquid crystal molecules may be controlled differently in the first region 255 and the second region 254. Accordingly, different gray levels may be expressed in the first region 255 and the second region 254. This may result in a substantially similar improvement in lateral visibility to a case where a pixel electrode is split into two or more sub-electrodes and then different voltages are applied to the sub-electrodes using a plurality of TFTs. In the illustrated exemplary embodiment, a pixel voltage is applied to the pixel electrode 195 using only one TFT. Thus, a sufficiently high aperture ratio may be secured.

Furthermore, the liquid crystal molecules rotate in different directions in four domains of each pixel. Specifically, the liquid crystal molecules tilt toward the center of each pixel while becoming vertically and horizontally symmetrical to each other in the domains. That is, the direction in which the liquid crystal molecules tilt is similar to the direction in which the branches 195b of the pixel electrode 195 of each pixel extend. Therefore, when seen from above, the liquid crystal molecules rotate in different directions in the first region 255 and the second region 254, thereby improving viewing angles.

Hereinafter, other embodiments of the invention will be described.

FIG. 8 is a plan view of an LCD according to another exemplary embodiment of the invention.

Referring to FIG. 8, the LCD according to the illustrated exemplary embodiment is different from the LCD 500 according to the exemplary embodiment of FIG. 2 in that an opening 257 is shaped like an island, not a line.

More specifically, the opening 257 is disposed in one pixel region, and an opening side 257a is disposed such that different parts (e.g., upper and lower parts) of a second common electrode 251b meet and are connected to each other at boundaries with adjacent pixel regions. Therefore, the opening side 257a further includes two boundary lines (e.g., side lines) in one unit pixel region compared to the exemplary embodiment shown in FIG. 3. Accordingly, the opening side 257a may be shaped like a hexagon, for example. However, the invention is not limited thereto, and each side of the hexagon may be smoothly curved, and the opening side 257a disposed at boundary lines of the pixel region may include not straight lines but curves close to straight lines. In the illustrated exemplary embodiment, since different parts of the second common electrode 251b meet and are connected to each other at the boundaries of a unit pixel region, a closed loop is defined in the unit pixel region. Therefore, the total resistance of the second common electrode 251b may be reduced.

FIG. 9 is a plan view of the second common electrode 251b disposed in one pixel region of FIG. 8.

Referring to FIG. 9, the opening side 257a of the second common electrode 251b may include a first diagonal line $d_1$, a second diagonal line $d_2$, a third diagonal line $d_3$, a fourth diagonal line $d_4$, a fifth diagonal line $d_5$, and a sixth diagonal line $d_6$. According to the illustrated exemplary embodiment, the first diagonal line $d_1$, the second diagonal line $d_2$, the third diagonal line $d_3$ and the fourth diagonal line $d_4$ may be disposed in the same manner as those of the opening side 256a of the second common electrode 250b of FIG. 3. However, directions in which the first through fourth diagonal lines $d_1$ through $d_4$ extend are not changed at a first point $E_1$ and a second point $E_2$. That is, the first through fourth diagonal lines $d_1$ through $d_4$ do not extend up to the first point $E_1$ and the second point $E_2$. Instead, the opening side 257a further includes the fifth diagonal line $d_5$ that connects the first diagonal line $d_1$ and the third diagonal line $d_3$ and the sixth diagonal line $d_6$ that connects the second diagonal line $d_2$ and the fourth diagonal line $d_4$. The fifth diagonal line $d_5$ and the sixth diagonal line $d_6$ may be parallel to each other and to the first direction.

An LCD according to another exemplary embodiment of the invention will now be described with reference to FIGS. 10 and 11.

Referring to FIG. 10, the illustrated exemplary embodiment is different from the exemplary embodiment of FIG. 2 in that a pixel electrode 195 further includes a plate part 196c. A stem part 196a may protrude from the plate part 196c. In an exemplary embodiment, the stem part 196a may protrude from corners of the plate part 196c. Here, a direction in which the stem part 196a protrudes may be substantially parallel to a gate line 120 or a data line 160. In addition, the stem part 196a may extend in a radial pattern from a center of the plate part 196c.

Branches 196b may be shaped like slits separated from each other by a predetermined distance. The branches 196b may protrude from the plate part 196c or the stem part 196a. The branches 196b may surround the plate part 196c and the stem part 196a and form an angle of approximately 45 degrees or −45 degrees with the gate line 120.

In the illustrated exemplary embodiment, an opening is defined in each of a first common electrode 252a and a second common electrode 252b. Specifically, a first opening 267 defined in the first common electrode 252a may be shaped like a cross as illustrated in FIG. 10. A second opening 266 defined in the second common electrode 252b may be shaped like the opening 256 according to the exemplary embodiment of FIG. 2. The first opening 267 may be located on the second opening 266. A side of the first opening 267 may be parallel to a gate line 120 or a data line 160.

Each pixel may be divided into a first region 263, a second region 264, and a third region 265. The first region 263 is a region where the first opening 267 is located. The second region 264 is a region where the first opening 267 is not located but the second opening 266 is located. The third region 265 is a region where the second common electrode 252b is located. Here, the intensity of an electric field increases from the first region 263 toward the third region 265. Therefore, liquid crystal molecules rotate more as the distance to the third region 265 decreases.

The first opening 267 according to the illustrated exemplary embodiment may be located at a center of a plate part 196c of a pixel electrode 195 and within the region of the plate part 196c. However, the invention is not limited thereto. In another exemplary embodiment, a first common electrode 253a without a first opening 267 may be provided to cover the whole defining a second insulating substrate 210 as illustrated in FIG. 13. The first common electrode 253a without the first opening 267 may obtain the same effect as the first common electrode 252a with the first opening 267.

In the illustrated exemplary embodiment, each pixel may be divided into the first region 263, the second region 264, and the third region 265 as described above. The first region 263 is a region where the first opening 267 is located. Since the first and second common electrodes 252a and 252b are not provided in the first region 263, no electric field is generated in the first region 263. Accordingly, the liquid crystal molecules remain vertically aligned even when a gate-on voltage is applied thereto.

In the illustrated exemplary embodiment, a domain partition region 197 is disposed between each branch 196b and an adjacent branch 196b in order to insulate them. In this structure, the intensity of a fringe field is highest at the edge of each pixel. Therefore, the liquid crystal molecules rotate toward a center of each pixel along the branches 196b.

FIGS. 12 and 13 are conceptual diagrams illustrating the arrangement state of liquid crystal molecules in LCDs according to various exemplary embodiments of the invention. Referring to FIG. 12, liquid crystal molecules disposed under a first opening 267 of a first common electrode 252a remain vertically aligned. However, liquid crystal molecules located on both sides of the liquid crystal molecules gradually rotate toward the first opening 267. Since the intensity of a fringe field increases toward the edge of an LCD, the liquid crystal molecules rotate more as the distance to the edge of the LCD decreases. Therefore, liquid crystal molecules located at the edge of the LCD may rotate 90 degrees from vertical alignment to become almost horizontal to the LCD. Referring to FIG. 13, a first common electrode 253a according to another exemplary embodiment is shaped like a single plate without an opening. Even in this case, liquid crystal molecules are aligned in the same manner as the liquid crystal molecules of FIG. 12.

FIGS. 14 and 15 are schematic diagrams illustrating a misalignment in a case where the exemplary embodiment of FIG. 2 is applied to a curved display.

A curved display is curved after a first substrate 100 and a second substrate 200 manufactured separately are bonded together. Here, the second substrate 200 is curved more than the first substrate 100. Therefore, the same location on the first substrate 100 and the second substrate 200 before the first substrate 100 and the second substrate 200 are curved becomes different locations after the first substrate 100 and the second substrate 200 are curved, which is referred to as a misalignment. In the curved display, the misalignment is a more important problem than the formation of texture. To solve the problem of the misalignment, a rectangular opening may be defined in the curved display as illustrated in FIG. 15.

FIG. 16 is a graph illustrating the change in visibility index with respect to an area ratio of the first region 255 (refer to FIG. 4) and the second region 254 (refer to FIG. 4) of the LCD 500 of FIG. 1. Referring to FIG. 16, front visibility forms a parabolic curve as a data voltage increases. However, lateral visibility shows higher transmittance than front visibility at low gray levels and lower transmittance than front visibility at high gray levels. Therefore, lateral visibility is poor.

To improve lateral visibility, the area of the first region 255 may be increased to be more than twice the area of the second region 254 in a first embodiment of the invention. Here, the area of the first region 255 may have four equal domains so as to obtain the same level of lateral visibility irrespective of an angle at which the LCD 500 is viewed. As illustrated in FIG. 16, as the area of the first region 255 increases gradually, an S-shaped curve becomes similar to a parabolic reference (Ref) curve. This indicates that lateral visibility shows lower luminance at low gray levels and higher luminance at high gray levels. As apparent from the experimental result of FIG. 16, a graph most similar to the Ref curve is obtained when the area ratio of the second region 254 to the first region 255 is 1:2.3.

In an LCD according to an exemplary embodiment of the invention, a single pixel electrode connected to one TFT may be used in one unit pixel region, and the unit pixel region may be divided into a plurality of regions in which different electric fields are generated. Therefore, a sufficiently high aperture ratio may be secured, and lateral visibility may be improved.

However, the effects of the invention are not restricted to the one set forth herein. The above and other effects of the invention will become more apparent to one of daily skill in the art to which the invention pertains by referencing the claims.

What is claimed is:

1. A liquid crystal display comprising:
a first substrate which comprises a pixel electrode disposed in each pixel;
a second substrate which faces the first substrate and comprises a common electrode and an insulating layer; and
a liquid crystal layer which is disposed between the first substrate and the second substrate,
wherein the common electrode comprises a first common electrode which is disposed on a whole surface defining the second substrate and a second common electrode which is disposed on the first common electrode with the insulating layer interposed therebetween and comprises an opening defined in each pixel, and each pixel comprises a first region in which the pixel electrode and the first common electrode face each other through the opening and a second region in which the pixel electrode and the second common electrode face each other,
wherein the pixel electrode is divided into a plurality of domains, wherein a portion of the opening which corresponds to each of the plurality of domains is symmetrical to another portion of the opening which corresponds to an adjacent domain.

2. The liquid crystal display of claim 1, wherein the pixel electrode comprises a stem part which forms a boundary between the plurality of domains and a plurality of branches which extend in different directions in two different domains of the plurality of domains.

3. The liquid crystal display of claim 2, wherein a boundary line between the second common electrode and the opening extends in a direction perpendicular to a direction in which the plurality of branches extends, and the direction in which the boundary line between the second common electrode and the opening extends is changed at the stem part.

4. The liquid crystal display of claim 2, wherein the opening is defined in the pixel electrode and has a hexagonal shape.

5. A display device comprising:
a first substrate;
a second substrate which faces the first substrate; and
a liquid crystal layer which is disposed between the first substrate and the second substrate,
wherein the first substrate comprises a gate line which is disposed on a first insulating substrate and extends along a first direction, a data line which intersects the gate line, is insulated from the gate line and extends along a second direction and a pixel electrode which receives a voltage from the data line, and the second substrate comprises a first common electrode which is disposed on a second insulating substrate, an overcoating layer which is disposed on the first common electrode and a second common electrode which is disposed on the overcoating layer and provided around an opening, and
wherein the pixel electrode overlaps both the first and second common electrodes,
wherein the display device is divided into a plurality of unit pixel regions, each defined by the gate line and the data line intersecting each other, wherein the second common electrode occupies a predetermined area of each of the plurality of unit pixel regions,
wherein a pattern of the second common electrode is repeated to correspond to each of the plurality of unit pixel regions, and
wherein the pixel electrode disposed in each of the plurality of unit pixel regions comprises:
a plate part;
a stem part which protrudes from the plate part and extends parallel to the gate line or the data line so as to divide the unit pixel region into a plurality of domains; and
branches which protrude from the plate part or the stem part, extend in different directions in different domains of the plurality of domains, and are separated from each other.

6. The display device of claim 5, wherein a portion of the second common electrode which corresponds to the plate part is removed.

7. The display device of claim 6, wherein the first common electrode has an opening defined at a location corresponding to the plate part, wherein the opening is parallel to the gate line or the data line.

8. The display device of claim 6, wherein each of the plurality of unit pixel regions is divided into a first region in which the second common electrode is not disposed and a second region in which the second common electrode is disposed, wherein a boundary between the first region and the second region is perpendicular to a direction in which the branches extend.

9. The display device of claim 8, wherein the boundary between the first region and the second region has a hexagonal shape in each of the plurality of unit pixel regions, and at least one of boundary lines between the first region and the second region is parallel to the data line.

10. The display device of claim 8, wherein an electric field generated in the first region is greater than an electric field generated in the second region.

11. The display device of claim 8, wherein boundary lines between the first region and the second region are parallel to the gate line between two adjacent unit pixel regions of the plurality of unit pixel regions.

* * * * *